Figure 1:
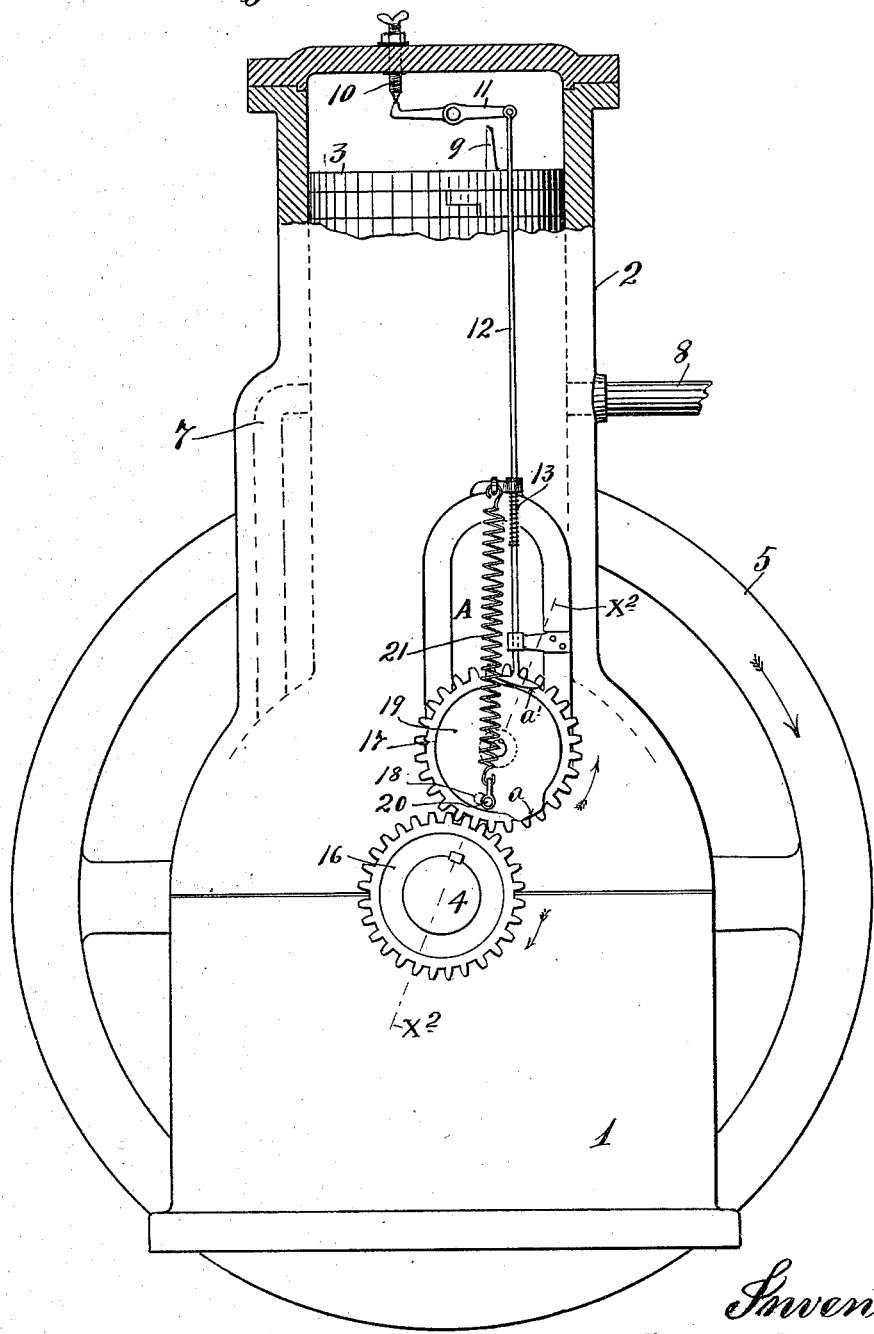

No. 734,851. PATENTED JULY 28, 1903.
G. A. GOODSON.
ELECTRIC IGNITER FOR EXPLOSIVE ENGINES.
APPLICATION FILED DEC. 16, 1901.
NO MODEL. 2 SHEETS—SHEET 1.

Witnesses
A. H. Opsahl
H. D. Kilgore

Inventor.
George. A. Goodson.
By his Attorneys.
Williamson & Merchant

No. 734,851. PATENTED JULY 28, 1903.
G. A. GOODSON.
ELECTRIC IGNITER FOR EXPLOSIVE ENGINES.
APPLICATION FILED DEC. 16, 1901.
NO MODEL. 2 SHEETS—SHEET 2.
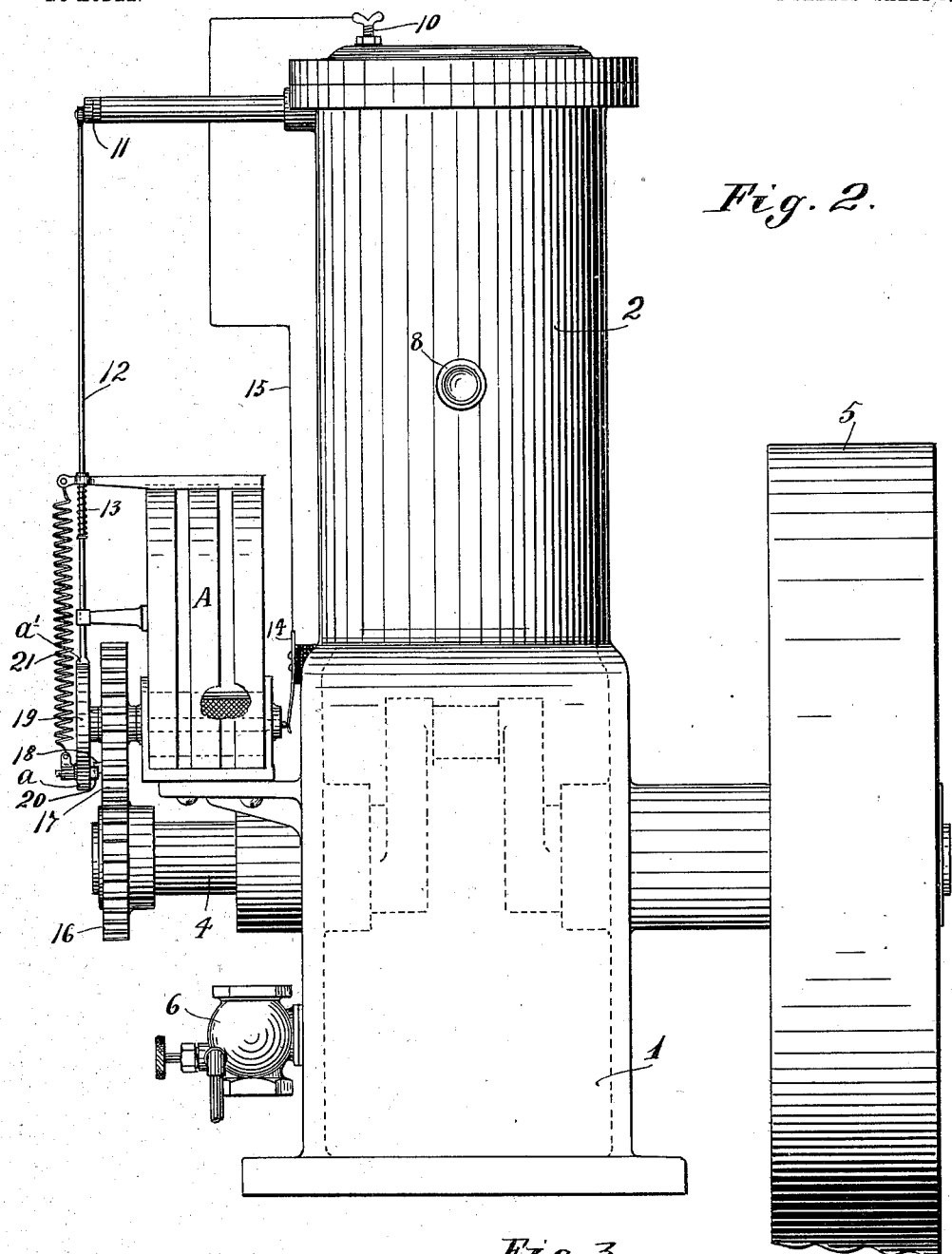
Fig. 2.
Fig. 3
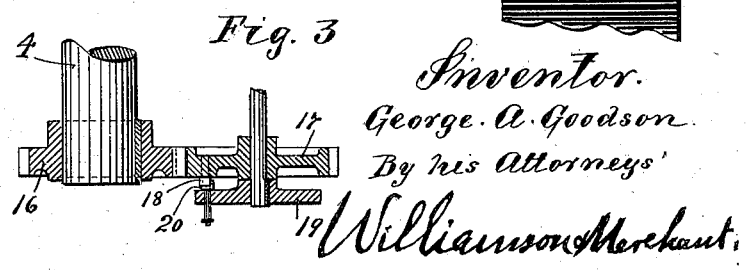
Witnesses.
A. H. Opsahl
H. D. Kilgore
Inventor.
George A. Goodson
By his Attorneys
Williamson & Merchant No. 734,851. Patented July 28, 1903.

UNITED STATES PATENT OFFICE.

GEORGE ARTHUR GOODSON, OF MINNEAPOLIS, MINNESOTA.

ELECTRIC IGNITER FOR EXPLOSIVE-ENGINES.

SPECIFICATION forming part of Letters Patent No. 734,851, dated July 28, 1903.

Application filed December 16, 1901. Serial No. 86,009. (No model.)

*To all whom it may concern:*

Be it known that I, GEORGE ARTHUR GOODSON, a citizen of the Dominion of Canada, residing at Minneapolis, in the county of Hennepin and State of Minnesota, have invented certain new and useful Improvements in Electric Igniters for Explosive-Engines and other Uses; and I do hereby declare the following to be a full, clear, and exact description of the invention, such as will enable others skilled in the art to which it appertains to make and use the same.

My invention has for its object to provide an improved electric igniter for explosive-engines; and it consists of the novel devices and combinations of devices, which will be hereinafter described, and defined in the claims.

It is a fact well known that most explosive-engines employ electric igniters. The required current is usually supplied from batteries or from a generator operated by the explosive-engine. The generators operated by the engine are usually either of the dynamo or the magneto type, and when such generators are employed it is the general custom also to provide batteries for use in starting the engine. Then after the engine comes up to the proper speed the batteries are cut out and the igniter is connected into the magneto or dynamo circuit. Sometimes differential or variable speed drives are provided for the generator of such construction that by making the proper shift the dynamo or magneto may be employed to start the engine, as well as when the engine is running under the effect of explosions. Batteries are bulky, expensive, liable to get out of order, and have a most annoying habit of becoming exhausted at unexpected moments, usually at the most inopportune time—to wit, when most needed to start or operate the engine. Variable-speed drives for the dynamo multiply parts, add to the cost, take additional space, and are not always reliable. With a view of disposing of batteries and dynamos it has also been hitherto proposed to employ intermittently-acting magnetos with spring-impelled or fluid-pressure-impelled parts for imparting the required quick or generating throw to the armature, regardless of the speed of the engine; but, so far as I am aware, in all such intermittently-acting magnetos disclosed in the prior art the engine-driven parts and the spring-driven parts were of such construction and so related that they might conflict with each other, or, so to speak, "tramp on their own feet," thereby rendering the same unreliable, or else the spring-driven or fluid-pressure-driven parts were of such construction and so mounted that they could not be brought to stopping position without jar or pounding, and hence would soon wear themselves out and be worthless in practice.

In my invention herein disclosed I employ an intermittently-acting magneto for generating the required current; but this magneto is of such construction as to be reliable and durable in practice. The engine-driven parts and the spring-impelled parts cannot conflict with each other, and the spring-impelled parts will come to stopping or normal position without jar or pounding action. My generator being reliable, a maximum spark is therefore always available from a primary current, regardless of the speed of the engine. Batteries and sparking coils are dispensed with. The engine can readily be started by hand, assuming the mixture and other things than the igniter to be in proper condition, because the spark is just the same when turning the engine by hand as when the same is running under the effect of its own explosions.

With the foregoing general statements in mind the following detailed description will be readily understood.

The invention is illustrated as applied to a two-cycle explosive-engine.

In the drawings, wherein like notations refer to like parts throughout the several views, Figure 1 is an end elevation with some parts broken away and others shown in section, illustrating one form of my invention in working position. Fig. 2 is a view of the same parts in side elevation, and Fig. 3 is a detail in section on the line $x^2\ x^2$ of Fig. 1.

The engine shown being of the well-known two-cycle type, any extended description thereof is deemed unnecessary. The parts thereof marked with notations are respectively the base-casting 1, cylinder-casting 2, piston 3, crank-shaft 4, fly-wheel 5, the Lunkenheimer or other suitable supply-valve 6, the charging-port 7, the exhaust-port 8, the deflector 9, the fixed electrode 10, the rocking or movable electrode 11, the igniter-rod 12, and the spring 13, applied to said rod 12 and normally acting to hold the movable electrode 11 in contact with the fixed electrode 10. The magneto A is shown as supported by a suitable bracket formed integral with or made fast to one of the engine-castings. The magneto of course is provided with its own frame of suitable form and material for properly supporting the armature and the magnetos. For the purposes of this case it is not deemed necessary to identify any of said supporting parts by reference notations. Respecting the magneto, however, it may be noted that one terminal of the armature-winding is brazed or otherwise made fast to the armature-shaft in direct contact therewith, and hence the current therefrom will reach the movable electrode 11 through the metallic parts of the generator and the engine-castings, and that the other terminal of the armature-winding is suitably insulated and proper contact therewith is made through a brush contact 14, as shown, which is suitably insulated and connected by wire 15 with the fixed electrode 10.

The magneto is shown located adjacent to the engine-shaft 4. On the engine-shaft 4 is fixed a gear-wheel 16, which engages with the loose gear-wheel 17 of the same number of teeth, mounted to revolve around the axis of the armature of the magneto and which because of its function may be termed the "engine-driven" trip or trip-wheel. As shown, the loose trip-wheel 17 is mounted directly on the armature-shaft; but it will be understood that it might have and preferably would have a separate bearing. Said loose or trip wheel 17 is provided with a lateral driving lug or projection 18 on its profile face for cooperation with the inwardly-projecting end of the crank-pin 20 of a crank-disk 19, keyed or otherwise made fast to the armature-shaft alongside the loose or trip wheel 17. A strong impelling-spring 21 has its upper end anchored to a fixed base of resistance or support, shown as fixed to and projecting from the permanent magnets of the magneto. The lower end of the spring 21 is connected to the crank-pin 20 of the crank-disk 19. Said impelling-spring 21 is applied under tension and tends to bring the crank-pin 20 to its highest point or upper dead-center and there holds the crank-disk and armature at its stopping or normal position. It should also be noted that the point of anchorage or base of resistance for the spring is so located that the axis of the spring crosses or, if produced, would cross the axis of the armature-shaft. It follows that the spring under the rotation of the crank-disk will shift to opposite sides of the armature-axis. Under the rotation of the engine-driven trip-wheel 17 its lateral stud 18, coming in contact with the inner projecting end of the crank-pin 20, will rotate the crank-disk 19, with the trip-wheel 17, for a part of the revolution—to wit, until the spring 21 has been shifted to the opposite side of the armature-axis as compared with its initial or starting position—thereby bringing the spring-impelled parts into tripping position, as shown in Figs. 1 and 2 of the drawings. Under said positive motion imparted to the crank-disk 19 under the driving action thereon of the engine trip-wheel 17 the impelling-spring 21 will of course be set under greatly-increased tension, and as soon as the spring-impelled parts come into tripping position—to wit, as soon as the crank-pin 20 passes its lower dead center—said spring 21 will become instantly operative to throw the crank-disk 19 and the armature forward in advance of the trip-wheel 17 in the same direction of rotation and at a speed independent of the speed of the engine and sufficiently fast to generate the required current. Otherwise stated, the generating throw of the armature depends upon the tension of the impelling-spring 21 at the time when the same is tripped into action by the release of the crank-disk 19 from the engine-driven trip-wheel 17—to wit, at the instant when the spring shifts from its initial side to the opposite side of the armature-shaft's axis. As shown, the crank-disk 19 is provided with a peripheral cam $a$, which comes in contact with a cam-foot $a'$ on the lower end of the igniter-rod 12 at the instant when the crank-disk 19 nears the limit of its spring-impelled throw, and when this happens the igniter-rod 12 will of course be forced upward, thereby rocking downward the contact end of the movable electrode 11, and thus breaking the circuit in the explosion-chamber at the instant of maximum generation. The connections being of a positive character, the circuit will always be broken at the predetermined instant in respect to the throw of the crank-disk 19 and the armature. In practice provision is made to vary the instant when the circuit is broken in respect to the motion of the engine-piston, so as to vary the time of ignition as may be desired to secure any predetermined lead in either direction of the engine's motion.

As the impelling-spring 21 brings the crank-pin 20 of the crank-disk 19 to its upper dead-center as its normal or stopping position, it is of course obvious that the spring-impelled parts will come to a stop with much less jar or pounding action than would otherwise be the case, and this is a novel feature of my invention.

As shown, the engine-driven trip-wheel 17 or primary impelling device and the impelling-spring 21, with the crank-disk 19 or secondary impelling devices, coöperate to rotate the armature or movable member of the generator always in a constant direction, the engine-driven trip or primary device first acting through the crank-disk of the secondary device to set the impelling-spring under tension during a part of the revolution, and then to release the same, thereby rendering the secondary devices operative under the motive power afforded by said spring to throw the crank-disk and armature forward in advance of the engine-driven trip-wheel 17 through the remainder of the revolution at the proper speed to generate the required current. This relation of the engine-driven parts to the spring-impelled parts constitutes a highly-important feature of my invention, for the reason that because of this relation the engine-driven parts and the spring-driven parts can never conflict with each other. The spring is always operative, if necessary, to throw the crank-disk and armature in advance of the engine-driven trip-wheel at a speed sufficient to generate the required current, and if the speed of the engine should ever catch up with the speed of the spring then no harm will be done, as the engine-driven part and the spring-driven part will simply rotate together in the common direction. The magneto is therefore reliable and durable in practice.

When it is said that the engine-driven trip-wheel or primary impelling device and the spring or secondary impelling devices coöperate always to rotate the movable member of the generator in a constant direction when the parts are of the form and related to each other as shown in the drawings it must be understood, of course, that this means with reference to any given direction of the engine-shaft's rotation. If the engine is reversed, then of course the armature will also reverse in its direction of rotation.

With respect to some features of the invention it must be understood that it is not necessary that the armature or movable member of the generator should rotate. With respect to the centering action of the spring-impelled parts—to wit, the stopping and starting thereof from a dead-center position of the spring-impelled crank—it is immaterial whether the armature rotates or oscillates. Otherwise stated, that feature is new over the prior art and is of importance whether applied in connection with a rotating or oscillating armature. To secure that result, it is only necessary to have an engine-driven trip, a spring-impelled crank subject to said trip, and a magneto with its armature connected to said spring-impelled crank for receiving the intermittent motion with said parts so disposed that the spring normally holds the crank impelled thereby on a dead-center and that the engine-driven trip will first force the crank away from the dead-center against the tension of said spring and then release the crank from the trip, thereby permitting the spring to impart the quick or generating throw to the armature and to restore the crank to its dead-center as its normal or stopping position, thus insuring the stopping of the spring-impelled parts without jar or pounding action. From this point of view—to wit, that of the centering or starting and stopping action—it is of course also immaterial where the spring-impelled crank or the engine-driven trip may be located in respect to the armature or in respect to each other, as long as they are capable of coöperation in the manner described to impart the quick or generating throw to the armature independent of the speed of the engine and to restore the spring-impelled crank to a dead-center, as its stopping or normal position.

It should be noted that with the device herein disclosed the action and relation of the engine-driven parts and the spring-impelled parts remain the same in either direction of the engine-shaft's rotation. Otherwise stated, the engine may be reversed without in any wise interfering with the action of the generator, and all the features of advantage as to the non-interference of the engine-driven and spring-driven parts apply regardless of the direction of rotation of the engine-shaft. This important advantage is due to the fact that this device employs a rotary impelling-crank which is subject to the engine-driven trip and an impelling-spring, with said parts so disposed that the engine-driven trip will rotate said impelling-crank against the tension of said spring for part of a revolution, but will release the crank as the latter passes a dead-center and render the spring operative to throw the crank forward in advance of the engine-driven trip, but in the same direction of rotation for imparting the required quick or generating throw to the movable member of the generator regardless of the speed of the engine. In respect to this important feature of novelty it is not material whether the movable member of the generator rotates or simply oscillates, and the relative location of the rotary impelling-crank, which is subject to the engine-driven trip and to the impelling-spring, is also a matter of indifference as long as the parts are capable of the actions above stated; but of course the movable member of the generator must be connected to the rotary impelling-crank in such a way as to receive motion therefrom under the coöperation of the engine-driven trip and the impelling-spring.

It will be understood that the principles involved admit of more or less modification in construction without departing from the spirit of my invention.

It should, perhaps, be noted that a spark of any desired size and strength can be secured by making the magneto of the proper capacity. Moreover, I have found that the generating capacity of the magneto can be increased within a considerable range by simply increasing the mass of the permanent or field magnets without increasing the size of the armature or impairing the quickness of the generating action. This fact is important, because it is desirable to keep those parts which must be stopped and started under the action of the impelling devices as light as possible. I have found that a comparatively small magneto properly constructed with the H-armature wound with fine wire will afford an abundantly-strong spark to effect the ignition of even comparatively poor mixtures.

It must be understood that the term "armature" or "movable member of the generator," as used in the description or claims, shall be taken to include and apply to the movable member of any electric generator regardless of the type thereof so long as capable of the functions herein set forth as due to the invention herein disclosed and claimed— for example, the said expressions, to wit, "armature" and "movable member of the generator" must be taken to apply to the movable soft-iron envelop of the Simms-Bosch type of magneto.

What I claim, and desire to secure by Letters Patent of the United States, is as follows:

1. An electric igniter for explosive-engines, comprising an electric generator having a rotary member, intermittently-acting means turning said member always in the same direction and at a speed which is independent of the speed of the engine, and a device actuated by the engine, for tripping said means into action, substantially as described.

2. An electric igniter for explosive-engines, comprising an electric generator having a rotary member, and primary and secondary impelling devices coöperative to rotate said member in a constant direction, of which two impelling devices, the primary impelling device receives motion from the engine, and the secondary impelling device is set under pressure and tripped into action by the primary impelling device, and, when tripped, may become operative to turn said rotary member of the generator in advance of the primary impelling device, at the proper speed to generate the required current, regardless of the speed of the engine, substantially as described.

3. An electric igniter for explosive-engines, comprising an electric generator having a rotary-member, an impelling-spring operative to turn said rotary member always in the same direction and at a speed which is independent of the speed of the engine, and a device actuated by the engine, for setting said spring under tension and tripping the same into action, substantially as described.

4. An elecric igniter for explosive-engines, comprising an electric generator having a crank on its rotary member, an impelling-spring applied to said crank and an engine-driven device operative on said spring, said parts coöperating to turn said rotary member always in a common direction and being so related that the engine-driven device will, during a part of a revolution, set said spring under tension and trip the same into action, for insuring motion to said rotary member of the generator during the remainder of the revolution, at the proper speed to generate the required current, regardless of the speed of the engine, substantially as described.

5. In an electric igniter for explosive-engines, the combination with a generator having a crank on its rotary member, of a spring applied to said crank and reacting against a base of resistance on a line which crosses the axis of the armature, at some point of the crank's revolution, and an engine-driven device operative on said crank, to turn the same therewith, for a portion of a revolution, thereby setting said spring under tension and rendering the same operative, upon passing the center, to rotate the armature, in advance of the engine-driven device and always in the same direction, substantially as and for the purpose set forth.

6. An electric igniter for explosive-engines, comprising an electric generator having a rotary member, intermittently-acting means turning said member always in the same direction and at a speed which is independent of the speed of the engine, a device actuated by the engine for tripping said means into action, and an automatic circuit-breaker operative to break the igniter-circuit, within the explosion-chamber, approximately at the instant of maximum generation, substantially as described.

7. In an electric igniter for explosive-engines, the combination with a magneto having a crank on its armature-shaft, of an engine-driven wheel loose and turning around the armature-shaft, a spring applied to said crank and anchored to a base of resistance on a line which crosses the axis of the armature, at some point in the crank's revolution, engaging parts on said crank and said loose wheel, respectively, for causing the latter to turn the former during a part of the revolution, and an automatic circuit-breaker in the igniter-circuit operative to break the circuit within the explosion-chamber approximately at the instant of maximum generation, substantially as described.

8. In an electric igniter for explosive-engines, the combination with an engine-driven trip, of a spring-impelled crank subject to said trip, and an electric generator having its armature connected with the said crank, for receiving an intermittent motion, at a speed independent of the speed of the engine, under the coöperation of said engine-driven trip and said spring-impelled crank, with said parts so disposed that said spring normally holds said crank on a dead-center, and that the trip will first force the crank away from the dead-center, against the tension of said spring, and then release the crank from the trip, thereby permitting the spring to impart the quick throw to the armature and to restore said crank to its dead-center, as its normal or stopping position, whereby the spring-impelled parts will stop without jar or pounding action, substantially as described.

9. An electric igniter for explosive-engines, comprising a magneto having a crank on its armature-shaft, a spring-impelling device applied to said crank, and an engine-driven trip-wheel mounted to revolve around the axis of said armature-shaft and operative first to set said impelling device under tension and then to trip the same into action, for imparting to said armature a quick or generating throw, at a speed independent of the speed of the engine, substantially as described.

10. In an electric igniter for explosive-engines, the combination, with an engine-driven trip, of an impelling-spring, a rotary impelling-crank, subject to said trip and said spring, and an electric generator having its movable member connected to said rotary impelling-crank, with said parts so disposed that said engine-driven trip will rotate said impelling-crank against the tension of said spring, for part of a revolution, but will release said crank as the crank passes a dead-center, and render the spring operative to throw the crank forward in advance of the trip, in the same direction of rotation, for imparting the required quick or generating throw to the movable member of the generator, regardless of the speed of the engine.

In testimony whereof I affix my signature in presence of two witnesses.

GEORGE ARTHUR GOODSON.

Witnesses:
 ELIZABETH KELIHER,
 F. D. MERCHANT.